P. W. HALLVARSON.
POCKETKNIFE.
APPLICATION FILED FEB. 10, 1921.
1,407,652.
Patented Feb. 21, 1922.
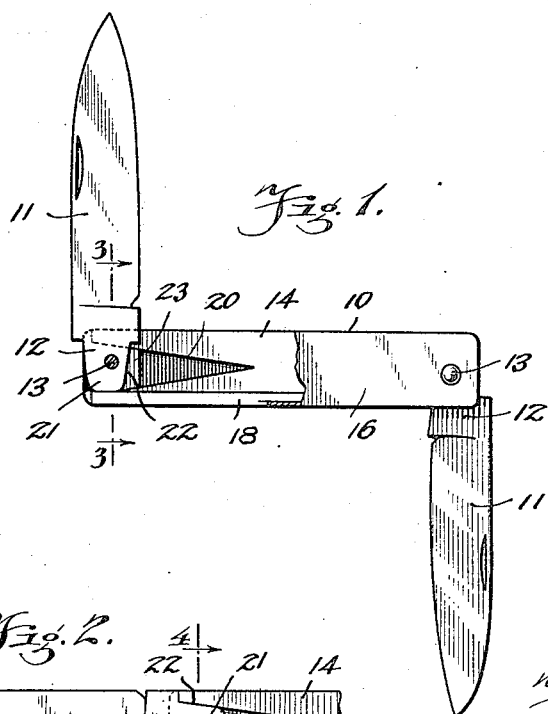
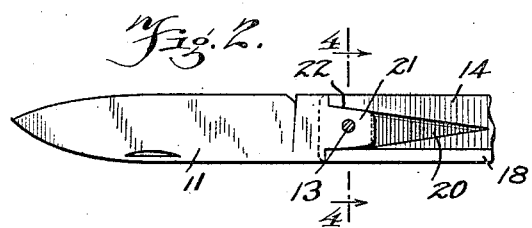
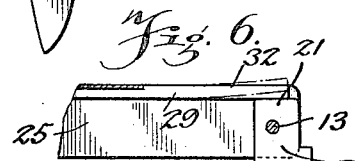
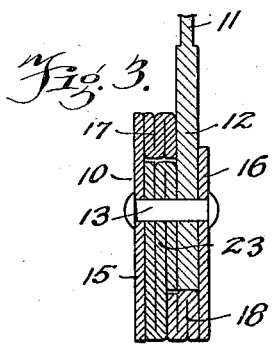
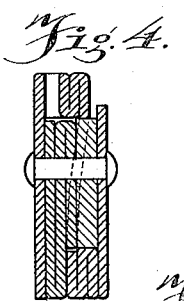
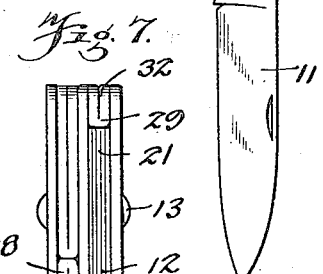
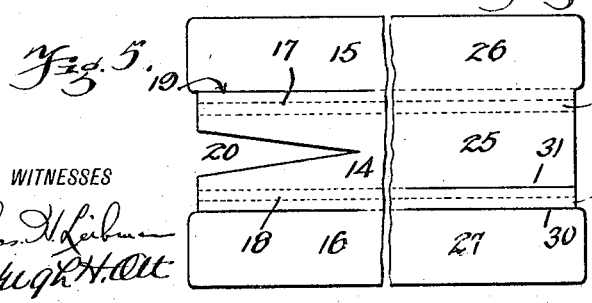
WITNESSES
INVENTOR
PETER W. HALLVARSON
BY
ATTORNEYS

UNITED STATES PATENT OFFICE.

PETER WILLIAM HALLVARSON, OF BLACK DIAMOND, ALBERTA, CANADA.

POCKETKNIFE.

1,407,652.  Specification of Letters Patent.  Patented Feb. 21, 1922.

Application filed February 10, 1921. Serial No. 443,899.

*To all whom it may concern:*

Be it known that I, PETER W. HALLVARSON, a subject of the King of Great Britain, and a resident of Black Diamond, in the Province of Alberta and Dominion of Canada, have invented a new and Improved Pocketknife, of which the following is a full, clear, and exact description.

This invention relates to pocket knives and the construction of the same, and has more particular relation to the handle structure thereof.

The invention contemplates and seeks for its main object to simplify and greatly reduce the cost of production of a knife of this character by constructing the handle from a single sheet of material which is stamped and bent to provide the blade receiving compartments.

A further object in view resides in the provision of a pocket knife in which the handle and blade springs are integral thereby eliminating the extra operation, and time and labor incident to securing the springs separately to the handle.

A further object of the invention resides in the provision of a handle construction which is of an extremely rugged nature whereby the same will withstand hard usage.

With the above recited and other objects in view, the invention resides in the novel construction, combination and arrangement of parts set forth in the following specification, pointed out in the appended claims and illustrated in the accompanying drawing in which;

Figure 1 is a side elevation of the preferred embodiment of the invention, illustrating the same partly in section with the blades partially open or extended.

Figure 2 is a fragmentary longitudinal sectional view of one end of the knife illustrating the blade in opened or extended position.

Figure 3 is a transverse sectional view taken approximately on the line 3—3 of Figure 1.

Figure 4 is a similar view taken approximately on the line 4—4 of Figure 2.

Figure 5 is a fragmentary plan view of one end of the blank from which the handle is constructed.

Figure 6 is a longitudinal sectional view through a modified form of the invention illustrating the blade partially opened.

Figure 7 is an end view thereof.

Figure 8 is a fragmentary plan view of one end of the blank from which the modified construction is formed.

Referring to the drawings by characters of reference, the knife comprises a handle 10 and blades 11, the shanks 12 of which are respectively pivoted to the opposite extremities of the handle by means of the rivets 13. In the preferred embodiment of the invention, the blank from which the handle is constructed comprises a central portion 14, and outer portions 15 and 16 connected to the opposite side edges thereof by the bights 17 and 18. The blank is adapted to be folded in substantially S form, the central portion 14 constituting a central wall, and the portions 15 and 16 the outer walls. The connecting bights 17 and 18 are reversely bent in a double S form to provide solid integral fillers affording a space between the central wall and each outer wall approximately twice the width of the material from which the handle is constructed. By this arrangement it will be observed that the handle provides two blade receiving compartments which open at opposite sides of the knife. In the preferred embodiment of the invention, the bights at their juncture with the outer walls are slitted as at 19 from their outer ends toward the center and the central walls or portions 14 are provided with the V shaped notches 20 extending inwardly from their outer ends. The butt 21 of each knife blade shank is provided with inclined opposite edges 22 which interengage with the inclined edges of the notch 20 when the blade is extended or opened. A supplemental filler block 23 is interposed between the side of the knife blade shank and the outer wall 15, and lies partially in the V shaped notch, the pivot bolt 13 passing through an aperture formed therein. The bight together with the portion of the central wall lying on the opposite sides of the notch 20 are bent laterally to provide a resilient tongue which operates when the knife is extended to spring over and engage the butt of the shank to lock the same against closing of the blade when extended. When the blade is closed the resilient tongue frictionally co-acts with the side of the blade proper to retain the same in closed relation.

In the modified form of the invention, the blank from which the handle is constructed includes a central portion 25 and outer portions 26 and 27 connected by the bights 28 and 29. In this form as in the preferred form, the blank is bent into a substantially S form and the bights 28 and 29 are reversely bent in a double S form to provide a solid integral filler affording a space between the central portion or wall 25 and the outer portions or walls 26, equal to approximately twice the width of the material from which the handle is constructed. In this form however, the bight 29 at one end is slitted as at 30 and 31 respectively at the juncture of said bight with the outer wall 27 and the inner wall 25 to provide an integral spring tongue 32 which operates on the shank butt 21 of the blade.

While there has been illustrated and described several preferred embodiments of the invention, no limitation is necessarily made to the precise structural details as it is understood that variations and modifications which properly fall within the scope of the appended claims may be resorted to when found expedient.

I claim:

1. A pocket knife handle construction, comprising a single sheet of material bent to provide parallel spaced walls connected by bights reversely bent in upon themselves to provide a solid integral filler affording a space between the walls equal to twice the width of the material from which the handle is constructed, said space defining a knife blade receiving compartment.

2. A pocket knife handle construction, comprising a single sheet of material bent to provide parallel spaced walls connected by bights reversely bent upon themselves to provide a solid integral filler affording a space between the walls equal to twice the width of the material from which the handle is constructed, said space defining a knife blade receiving compartment, a portion of said bights adjacent the outer end adapted to be slitted at their juncture with the walls to provide a spring tongue for holding the blade respectively in open or closed relation.

3. A pocket knife handle construction, comprising a single sheet of material bent into substantially S form in cross section, providing a central wall and outer walls connected to the opposite edges of the central wall by reversely curved connecting portions, said portions being reversely bent upon themselves to provide a solid integral filler affording a space between the central wall and each outer wall of a width approximately twice the width of the material from which the handle is formed, said spaces defining knife blade receiving compartments opening respectively at the opposite sides of the handle.

4. A pocket knife handle construction, comprising a single sheet of material bent into substantially S form in cross section, providing a central wall and outer walls connected to the opposite edges of the central wall by reversely curved connecting portions, said portions being reversely bent upon themselves to provide a solid integral filler affording a space between the central wall and each outer wall of a width approximately twice the width of the material from which the handle is formed, said spaces defining knife blade receiving compartments opening respectively at the opposite sides of the handle, said central wall having V shaped notches extended inwardly from the opposite ends thereof, the connecting portions at their juncture with the outer walls being slitted from the outer end and bent inwardly to provide resilient tongues adapted to spring over the butt of the blade shanks when the blades are open to retain the same extended and adapted to frictionally engage the sides of the blade when the knife is closed for retaining the same in closed relation.

5. A pocket knife handle construction, comprising a single sheet of material bent upon itself into substantially U shape in cross section to provide parallel side walls and a connecting bight bent reversely to constitute a solid filler affording a space between the side walls of approximately twice the width of the material from which the handle is formed, said space defining a knife blade receiving compartment.

6. A pocket knife handle construction, comprising a single sheet of material bent into substantially S form in cross section, providing a central wall and outer walls connected to the opposite edges of the central wall by reversely curved connecting portions, said portions being reversely bent upon themselves to provide a solid integral filler affording a space between the central wall and each outer wall of a width approximately twice the width of the material from which the handle is formed, said spaces defining knife blade receiving compartments opening respectively at the opposite sides of the handle, said connecting portions at their juncture with the inner and outer walls being respectively slitted to form a resilient tongue adapted to co-act with the butt of the blade shanks to retain the same respectively in extended or closed relation.

PETER WILLIAM HALLVARSON.